Patented Sept. 6, 1949

2,481,413

UNITED STATES PATENT OFFICE 2,481,413

COLLOIDAL COMPOUNDS CONTAINING METALLIC IONS IN INACTIVE STATE

George E. Grindrod, Oconomowoc, Wis., assignor to Wisconsin Alumni Research Foundation, Madison, Wis., a corporation of Wisconsin No Drawing. Application April 17, 1945, Serial No. 588,893

3 Claims. (Cl. 167—68)

The present invention relates to the art of fortifying foods and foodstuffs with minerals, and is concerned more particularly with the provision of a composition containing all or some of the metals iron, copper and manganese, in which composition the metals do not ionize and exhibit no catalytic activity but are releasable, in a state of catalytic or/and chemical activity, in the digestive tract. The invention includes both process and product aspects.

The metals iron, copper and manganese, or some one or more of them, are required for the generation of hemoglobin. A deficiency of these metals in the diets of man and other animals results in nutritional anemia. A slight deficiency retards the rate, and the extent, of growth of young animals. Deficiency is widespread. The metallic constituents are in general incompatible with most foods since they act as catalysts to oxidize vitamins and other constituents contained therein. They have heretofore been incompatible in canned or sterilized foods, whether present therein naturally or whether added as fortifying agents.

The simple compounds of the metals, even if they are water-insoluble, react sufficiently with foods to cause oxidation. In wet canned foods and in liquiform foods they either go into solution slowly or react by direct contact of the particles. Dietary mineral fortification, accordingly, has heretofore been accomplished by enclosing a dose of ingredients carrying the metals in an assimilable container, such as the conventional gelatin capsule, and ingesting the dose as such. While this method is successful, it is both circumscribed as to applicability and inconvenient.

It is an object of the present invention to provide a metallic compound or composition which is compatible with foods, foodstuffs and foodstuff factors including vitamins. Another object of this invention is the provision of a food- or foodstuff- compatible compound or composition containing a metal or metals of the anti-anemia group, which compound or composition contains an adequate proportion of the metal or metals and which can be combined with a wide variety of foods, foodstuffs and foodstuff factors whereby adequately to fortify the latter with such metal or metals and hence to render separate medication unnecessary. A further inventive object is the provision of a process of inactivating potentially catalytically active finely divided particles of a compound of a metal having dietary utility.

I have found that various water-insoluble compounds of metals, e. g., water-insoluble compounds of metals of the anti-anemia group, can be rendered compatible with foods, foodstuffs and foodstuff factors including normally readily oxidizable vitamins by a process which involves encapsulating the metal compound, in substantially colloidally disintegrated state, with films, sheaths, layers or coatings of a suitable assimilable protective colloid. More particularly, I have found that "permanently" non-ionized and unreactive compounds of iron, copper and/or manganese can be produced, in which minutely subdivided particles of complex colloidal structures of the metal compounds are encapsulated in the same or a different colloid, and that while the so-encapsulated particles will not react by contact with potentially readily oxidizable components of a food and will not release metallic ions so long as they remain in a medium of substantially the same hydrogen ion concentration as that in which they were formed, the contained metals will become active when treated with gastric juice.

The production of the inactive metallic compounds or colloidal metallic structures includes the steps of making a colloidal dispersion of a water-insoluble compound of the selected metal or metals and of causing the dispersion to undergo a colloidal reaction with a dispersed colloid. According to the preferred embodiment of the process of the invention, two distinct reactions are involved: in the first, which is a chemical reaction in the ordinary sense of that term, a salt of the selected metal is reacted with a suitable protein compound to produce a water-insoluble organo-metallic compound; while in the second, involving an adsorption reaction, particles of the metal-protein compound in substantially colloidally dispersed condition are caused to adsorb over their surfaces films or coatings of an assimilable colloid (e. g., of a suitable protein). There are several methods of inducing both reactions, and there are several colloidal substances adapted to enter into the reactions. Compounds or materials which are assimilable and non-toxic are especially referred to.

The invention will now be described more specifically and with reference to the employment of casein for both the primary and the secondary reactions above described.

The three metals of the anti-anemia group will react with casein to produce caseinates. Either an alkali (e. g., sodium) caseinate or natural calcium caseinate may be used for the primary reaction. The metallic ions under the conditions hereinafter specified react with caseinates to produce insoluble metallic compounds. The primary reaction is brought about as follows:

I first prepare a solution of the inorganic metallic salts as follows:

$FeSO_4.7H_2O$ _____ 114.5 gm per liter, equals 23 gm Fe per liter
$MnSO_4.H_2O$ _____ 7.25 gm per liter, equals 2.36 Mn per liter
$CuSO_4.5H_2O$ _____ 9.03 gm per liter, equals 2.36 Cu per liter Next, concentrated skim milk, of about 22.5% total solids, is prepared. This generally carries the amount of casein required to combine with the metals in the following ratio:

1 kg. of concentrated milk: 80 cc. of above solution. The weights of the salts above specified are dissolved together in 1 liter of air-free distilled water, so that the 80 cc. carries the required proportions of all three metals.

The concentrated skim milk, as a source of casein, and the measured quantity of the metallic solution, are mixed cold. The metallic solution will not coagulate the milk if it is of normal composition. The mixture may be heated somewhat, usually to a temperature near the boiling point, by ordinary means, but should not be heated to a temperature at which the mixture coagulates. Then, the partially heated mixture is placed in a closed pressure vessel, which is fitted with a steam jet, or a multiple steam jet. An apparatus adapted for this use is that disclosed in U. S. Patent No. 1,714,597 to George E. Grindrod. Other known means may be employed. In this vessel, the mixture is heated by injection of high pressure steam to approximately 250° F. The object of the high pressure steam jet heating is to supply a severe dispersive effect and agitation as the mixture reaches the coagulation point. Under sufficient dispersive effect, the metallic ions will react completely with the casein, to produce a fine precipitate of insoluble metallic caseinates. When heating is employed, the reaction tends to be incomplete, and the resulting precipitate tends to contain an appreciable quantity of unreacted metal salts. While it is possible to remove residual ionizable metal salts from such partial reaction product, as by dialysis or washing, I prefer to resort to the combination of vigorous agitation with heating for effecting practically complete reaction of the metal ions. Rapid, steam jet heating brings about complete reaction of the metals. Other means of applying the necessary energy to promote the reaction may also be used, e. g., a colloid mill.

The heat-treated mixture, upon discharge, will be found to consist of a fine curd precipitate of the metallic caseinates, suspended in the milk serum. The mass is separated from the serum either by filtration or centrifuging. The wet precipitate may represent as much as one half of the weight of the concentrated milk which was used.

The moist mass is next redispersed in a protective colloid. Either a solution of casein or concentrated skim milk may be used as the protective colloid. Approximately 500 grams of 10% sodium caseinate in water, or of concentrated skim milk carrying about the same proportion of casein, is mixed with the separated coagulum from each kg. unit of original starting material, and the mixture is then put through a colloid mill to disperse the particles of coagulum into the protective solution in a state of division approaching colloidal. The wet precipitate breaks up readily, and a colloidal dispersion is obtained with less power than would be required if it were allowed to dry. This redispersion is usually accomplished without heating. Considerable adsorption of casein onto the particles takes place in the mill, but the primary object of this step is to disperse the coagulum into particles so fine that they will have the appearance of being in solution, and also to place them in that degree of dispersion where they will attract (i. e., adsorb) additional colloid. Following the colloid mill treatment, the material has the appearance of being a viscous fluid. The particles may, at this stage, be coated with adsorbed casein so as to render them wholly inactive. But, if the dispersion is sufficiently fine, further adsorption may be brought about by simply heating the mass. The finer the dispersion, the greater is the subsequent adsorption caused by a given amount of heat. The mass coagulates completely if heated enough. Since each subdivided particle of the precipitate carries an equal electrical charge, the surrounding casein is attracted inversely according to the size of the dispersed particles. All of the surrounding casein may be caused to combine with the dispersed particles, if sufficient energy is applied either as heat or by means of the colloid mill. But, if the product is to be used in milk, the maximum particle size, after adsorption, should be 10 microns or less.

The secondary, or colloidal adsorption, reaction preferably is effected as follows:

The fluid mass is placed in a steam jet vessel such as that described in U. S. Patent No. 1,714,597 and therein is heated and simultaneously agitated by fine steam jets to a point near the temperature at which it would coagulate; thereupon the mixture is discharged to a vacuum cooling vessel for prompt cooling and complete de-aeration.

The result of the above process is a colloidal dispersion of metallic compounds, the colloidal particles or aggregates of which are encapsulated by films or layers of an adsorbed assimilable protective colloid. It is a stable fluid which per se is adapted to be incorporated into a food or foodstuff to fortify the latter with metals of the anti-anemia group. Into this stable fluid ascorbic acid or other normally readily oxidizable vitamin safely may be incorporated, by known technique, to provide a concentrated combination of the vitamin and the organo-metallic complex which combination is admirably suitable for addition to other food materials to fortify the latter both with the vitamin and with the anti-anemia metals.

The fluid product above described may be spray-dried to produce a dry fortifying agent for addition to dry foods and foodstuffs, for fortification of the latter with the organo-metallic compounds alone or with a combination of the organo-metallic compounds and the desired vitamin, with or without other desirable food factors. Or, the fluid material may be added to liquiform foods in course of processing, e. g., to animal feeds, or to cereal products intended for human consumption.

Casein is well suited for use as the assimilable protective colloid because it is insoluble in a serum approximately neutral, e. g., in the liquid phase of milk and most non-acid foods, but goes into solution quickly when in contact with hydrochloric acid of the concentration which exists in the stomach. Other assimilable colloids having characteristics similar to those of casein, e. g., proteins such for instance as soy bean casein, zein, and the like, may be substituted for the casein of the above example.

The metallic complex, made as above described, has the following characteristics: Serum derived from the colloid by filtration shows no reaction for the metals which were used. But, when incubated with gastric juice, the colloid goes into solution, and shows, by simple chemical test, the presence of the added metals. Also, the colloid, in admixture with milk or other fatty material, shows no catalytic activity by way of promoting rancidity of the fat. It does not accelerate the oxidation of ascorbic acid, unless acidified to the degree required to dissolve casein.

When the colloid is added to the diet of a young rat in the proportion of approximately 1.3% of the entire intake, the remainder of the diet being such that nutritional anemia would have developed, nutritional anemia is prevented, and the rat shows an accelerated production of hemoglobin.

The product made as above described carries the three essential metals in such proportion that each kilogram represents approximately:

750 mg of iron
  75 mg of copper
  75 mg of manganese

If used for the fortifying of evaporated milk, the minimum desired fortification is 1 mg of copper per unit of 400 grams of the milk. This would require addition of 13.3 grams of the colloid to each 400 gram can of the product, or approximately 3% by weight. Higher, or lower, concentrations of the metals can, of course, be made as desired. But, if casein is used as the combining agent and as the dispersing agent, the maximum ratio will be about 1 unit by weight of the metals to each 180 units of casein. To retain fluidity, and a consistency suitable for mixing into foods, the above specified ratio is approximately the best.

A dispersion of any individual organo-metallic complex can be made in the same manner as above described, and the separately prepared organo-metallic complexes can be used alone or can be mixed together in such proportions as desired. By this expedient one readily may produce a variety of mixtures, adapted to meet a variety of requirements, from stocks of the separately prepared organo-metallic complexes.

It is to be understood that my invention is not limited to the specific reactants, or to the precise proportions, set out in the above example. Thus, it is to be understood that in the step of making the organo-metallic compounds it is clearly within the scope of my invention to substitute other water-soluble salts of iron, copper and manganese, e. g., corresponding amounts of the chlorides, lactates, acetates, etc., of the metals, for the sulphates there recited. Also, it is to be understood that in the carrying out of the specific example I can use concentrated skim milk of higher total solids—e. g., up to 30 or 35% total solids—content instead of the 22.5% material there recited. The latter concentration is adapted to work well when the reaction is effected at about 250° F. in about 15 minutes; when using a more concentrated skim milk the reaction may be effected at a lower temperature.

I claim:

1. Process which comprises reacting a soluble salt of a metal of the group consisting of copper, iron and manganese with an aqueous dispersion of an assimilable protein to produce a water-insoluble non-ionizable precipitate containing the metal and the protein in chemical union, separating the precipitate from the aqueous medium, re-dispersing the still moist precipitate into a substantially colloidal suspension in the presence of an assimilable proteinous protective colloid in an aqueous medium, and effecting adsorption of the protective colloid on the surfaces of the particles of the dispersed precipitate by heating the suspension, in a pressure vessel, to an elevated temperature of the order of 250° F. for a few minutes while simultaneously subjecting the suspension to violent agitation whereby said particles are encapsulated within the adsorbed protective colloid.

2. Process which comprises reacting a soluble salt of a metal of the group consisting of copper, iron and manganese with an aqueous dispersion of a water-dispersible assimilable protein to produce a water-insoluble non-ionizable precipitate containing the metal and the protein in chemical union, re-dispersing the still moist precipitate into a substantially colloidal suspension in the presence of an aqueous dispersion of an assimilable proteinous protective colloid, effecting adsorption of the latter on the surfaces of the particles of the dispersed precipitate by heating the suspension, in a pressure vessel, to an elevated temperature of the order of 250° F. for a few minutes while simultaneously subjecting the suspension to violent agitation whereby said particles are encapsulated within the adsorbed protective colloid, and dehydrating the resulting product.

3. Process which comprises reacting a soluble salt of a metal of the group consisting of copper, iron and manganese with an aqueous dispersion of casein to produce a water-insoluble non-ionizable precipitate containing the metal and the casein in chemical union, re-dispersing the still moist precipitate into a substantially colloidal suspension in the presence of a stable aqueous dispersion of casein, and effecting adsorption of the latter on the surfaces of the particles of the dispersed precipitate by heating the suspension, in a pressure vessel, to an elevated temperature of the order of 250° F. for a few minutes while simultaneously subjecting the suspension to violent agitation whereby said particles are encapsulated within the adsorbed casein.

GEORGE E. GRINDROD.

REFERENCES CITED

The following references are of record in the file of this patent:

UNITED STATES PATENTS

| Number | Name | Date |
|---|---|---|
| 1,662,920 | Leland | Mar. 20, 1928 |
| 2,028,575 | Torigian | Jan. 21, 1936 |
| 2,082,233 | Hoessle et al. | June 1, 1937 |
| 2,086,766 | Chuck | July 13, 1937 |
| 2,103,153 | Dunham | Dec. 21, 1937 |
| 2,150,472 | Vessie | Mar. 14, 1939 |
| 2,184,617 | Hurd | Dec. 26, 1939 |
| 2,239,543 | Andrews et al. | Apr. 22, 1941 |
| 2,300,410 | Ferrari | Nov. 3, 1942 |
| 2,310,383 | Andrews et al. | Feb. 9, 1943 |
| 2,359,413 | Freedman | Oct. 3, 1944 |
| 2,399,120 | Hurd | Apr. 23, 1946 |
| 2,410,110 | Taylor | Oct. 29, 1946 |
| 2,410,417 | Andersen | Nov. 5, 1946 |

FOREIGN PATENTS

| Number | Country | Date |
|---|---|---|
| 285,091 | Great Britain | June 10, 1929 |